United States Patent

Mory et al.

[11] 3,897,411
[45] July 29, 1975

[54] MONOAZO PIGMENTS CONTAINING A PHENYLAMINO-QUINAZOLINE RADICAL

[75] Inventors: Rudolf Mory, Dornach; Rolf Müller, Aesch, both of Switzerland

[73] Assignee: Ciba-Geigy Corporation, Ardsley, N.Y.

[22] Filed: Aug. 3, 1973

[21] Appl. No.: 385,617

[30] Foreign Application Priority Data
  Aug. 17, 1972 Switzerland............ 12197/72

[52] U.S. Cl......... 260/154; 106/288 Q; 117/123 C; 117/138.8 R; 117/138.8 UA; 117/138.8 D; 117/138.8 E; 117/138.8 F; 117/139; 117/140; 260/37 R; 260/37 SB; 260/37 N; 260/37 PC; 260/40 R; 260/40 P; 260/4 TN; 260/42.21; 260/140; 260/250 P; 260/251 Q; 260/307 A; 260/309.2 A; 260/310 C
[51] Int. Cl.... C09b 29/32; C09b 29/36; D06p 1/04
[58] Field of Search..................... 260/154

[56] References Cited
UNITED STATES PATENTS

| | | | |
|---|---|---|---|
| 3,113,938 | 12/1963 | Nakaten et al. | 260/204 |
| 3,116,278 | 12/1963 | Gross et al. | 260/154 X |
| 3,118,870 | 1/1964 | Dietz et al. | 260/154 |
| 3,154,532 | 10/1964 | Weidinger et al. | 260/154 |
| 3,336,283 | 8/1967 | Weissauer | 260/154 |
| 3,711,461 | 1/1973 | Pretzer et al. | 260/154 |
| 3,719,657 | 3/1973 | Hama et al. | 260/154 |

Primary Examiner—Floyd D. Higel
Attorney, Agent, or Firm—Vincent J. Cavalieri

[57] ABSTRACT

Monoazo pigments of the formula

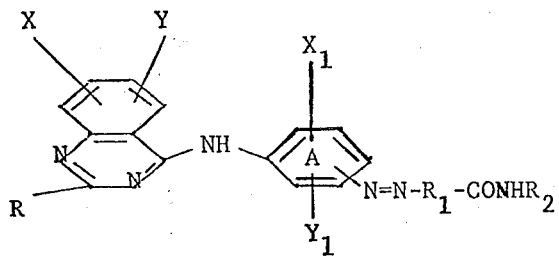

wherein R represents hydrogen, an alkyl or aryl group, $R_1$ represents a hydroxynaphthalene radical in which the azo, hydroxy and carbonyl groups are in the 1,2,3-position, or the radical of the formula

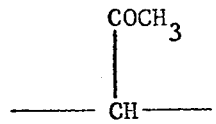

$R_2$ represents a benzene or naphthalene radical which contains a five- or six-membered hetero ring bound by condensation, X and Y represent hydrogen, halogen, lower alkyl or alkoxy groups, and $X_1$ and $Y_1$ represent hydrogen, halogen, lower alkyl, alkoxy or alkoxycarbonyl groups or trifluoromethyl or cyano groups, whereby in ring A the azo and amino groups are in the m- or p-position with respect to each other are prepared. The pigments may be used for pigmenting high-molecular organic materials, such as, cellulose, ethers, polyesters, alkyd resins and polycarbonates.

8 Claims, No Drawings

MONOAZO PIGMENTS CONTAINING A PHENYLAMINO-QUINAZOLINE RADICAL

It has been found that new monoazo pigments of the formula

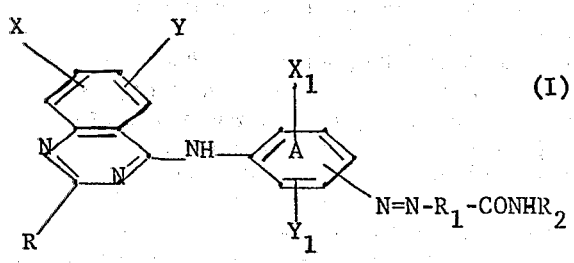

are obtained, wherein R represents hydrogen, a lower alkyl or aryl group, $R_1$ represents a hydroxynaphthalene radical in which the azo, hydroxy and carbonyl group are in the 1,2,3-position, or the radical of the formula

$R_2$ represents a benzene or naphthalene radical which contains a five- or six-membered hetero ring bound by condensation, X and Y represent hydrogen, halogen, lower alkyl or alkoxy groups, and $X_1$ and $Y_1$ hydrogen, halogen, lower alkyl, alkoxy or alkoxycarbonyl groups or trifluoromethyl or cyano groups, whereby in ring A the azo and amino groups are in the m- or p-position with respect to each other, by the coupling of a diazo compound or diazoamino compound of an amine of the formula

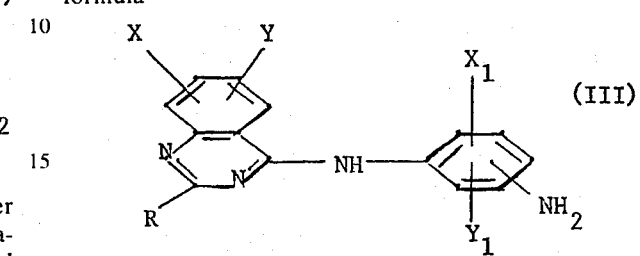

with a coupling component of the formula

In the given and subsequent definitions, the term "lower" before alkyl denotes that the substituents assigned to it contain 1 to 6 carbon atoms.

Of particular interest are monoazo pigments of the formulae

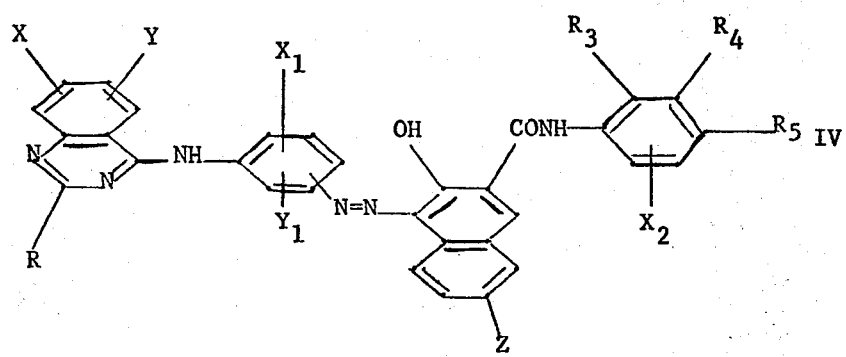

and

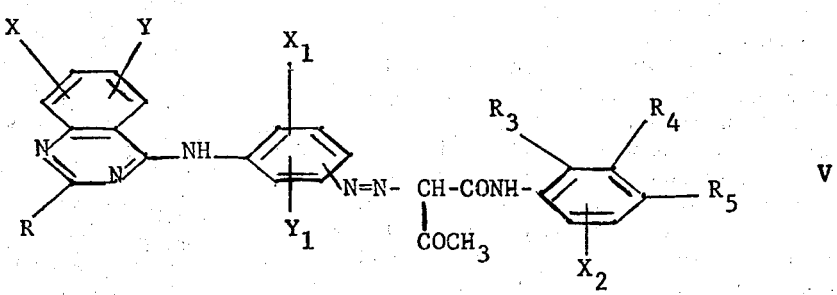

wherein R, X, Y, $X_1$ and $Y_1$ have the above given meanings, and of $R_3$, $R_4$ and $R_5$, each two adjacent radicals form a condensed heterocyclic ring containing one or two groupings of the formula — NHCO —, and the third radical, as well as $X_2$, represents hydrogen, halogen, lower alkyl or alkoxy groups or nitro groups, and Z represents hydrogen, halogen or the methoxy or cyano group.

The radicals $R_3$ and $R_4$ or $R_4$ and $R_5$ forming a heterocyclic ring bound by condensation correspond preferably to the following ring members

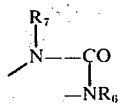 (VI)

wherein $R_6$ and $R_7$ represent hydrogen or lower alkyl groups. In particular, $R_6$ represents hydrogen and $R_7$ the methyl group.

The following are given as examples of the diazo components known per se:
4-(3'-amino-phenylamino)-quinazoline,
4-(3'-amino-phenylamino)-6- or -7-chloroquinazoline,
4-(3'-amino-6'-methyl-phenylamino)-quinazoline,
4-(4'-amino-phenylamino)-quinazoline,
4-(4'-amino-phenylamino)-6- or -7-chloroquinazoline,
4-(4'-amino-6'-methyl-phenylamino)-quinazoline,
4-(4'-amino-6'-methoxy-phenylamino)-quinazoline,
4-(2'-methoxy-4'-amino-5'-chlorophenylamino)-quinazoline,
4-(2'-methoxy-4'-amino-5'-methyl-phenylamino)-quinazoline,
4-(2'-methyl-4'-amino-5'-methoxy-phenylamino)-quinazoline,
4-(2',5'-dimethoxy-4'-amino-phenylamino)-quinazoline,
4-(2',5'-diethoxy-4'-amino-phenylamino)-quinazoline,
4-(2',5'-dimethyl-4'-amino-phenylamino)-quinazoline,
4-(2',5'-dichloro-4'-amino-phenylamino)-quinazoline.

The aforementioned 4-substituted quinazolines can be additionally substituted by, for example, a 2-methyl group or 2-phenyl group.

Instead of the diazonium salts, it is also possible to use the corresponding diazoamino compounds. These are obtained, using a known process, by coupling of an aryldiazonium salt with a primary or, preferably, secondary amine. A wide variety of amines are suitable for this purpose; examples are: aliphatic amines, such as methylamine, ethylamine, ethanolamine, propylamine, butylamine, hexylamine, and particularly dimethylamine, diethylamine, diethanolamine, methylethanolamine, dipropylamine or dibutylamine, aminoacetic acid, methylaminoacetic acid, butylaminoacetic acid, aminoethanesulphonic acid, methylaminoethanesulphonic acid, β-aminoethylsulphuric acid; alicyclic amines, such as cyclohexylamine, N-methylcyclohexylamine, dicyclohexylamine; aromatic amines, such as 4-aminobenzoic acid, sulphanilic acid, 4-sulpho-2-aminobenzoic acid, (4-sulphophenyl)guanidine, 4-N-methylaminobenzoic acid, 4-ethylaminobenzoic acid, 1-aminonaphthalene-4-sulphonic acid, 1-aminonaphthalene-2,4-disulphonic acid; heterocyclic amines, such as piperidine, morpholine, pyrrolidine, dihydroindole and, finally, also sodium cyanamide or dicyandiamide.

As a rule, the diazoamino compounds obtained are difficultly soluble in cold water, and can be separated, optionally after salting out, in crystalline form from the reaction medium. In many cases, the moist press cakes can be employed for the further reaction. In certain cases, however, it can prove advantageous to remove the water from the diazoamines by vacuum drying prior to the reaction.

The coupling of the diazoamino compound with the coupling component is performed in an organic solvent, e.g. chlorobenzene, o-dichlorobenzene, nitrobenzene, pyridine, ethylene glycol, ethylene glycol monoethyl or -monomethyl ether, dimethylformamide, formic acid or acetic acid. With the use of solvents miscible with water, it is not necessary to employ the diazoamino compounds in the anhydrous form. The aqueous-moist, suction-filtered press cakes, for example, can be used.

The coupling is advantageously performed hot, preferably at a temperature of between 80° and 180°C, in an acid medium, and is very rapid and, moreover, complete. If neutral solvents are used, then the addition of an acid, e.g. hydrochloric acid, sulphuric acid, formic acid or acetic acid, is of advantage. By virtue of their insolubility, the pigments obtained can be isolated from the reaction mixture by filtration. An aftertreatment with an organic solvent, which is necessary in the case of pigments obtained by aqueous coupling means, is therefore not required in most cases.

Applicable coupling components are 2,3-hydroxynaphthoic acid arylides or acetoacetic acid arylides wherein $R_2$ in formula I represents a benzimidazolone, benzoxazolone, indazolone, phenmorpholone, naphthostyryl, naphthalimide, quinolone, quinazolone, 2,4-dihydroxyquinazoline, 2,3-dihydroxyquinoxaline or 1,4-dihydroxyphthalazine radical.

The following coupling components are given as examples:
5-(2',3'-hydroxynaphthoylamino)-benzimidazolone,
1-methyl-5-(2',3'-hydroxynaphthoylamino)-benzimidazolone,
5-(2',3'-hydroxynaphthoylamino)-6-methyl-benzimidazolone,
1-(3''-chlorophenyl)-5-(2',3'-hydroxynaphthoylamino)-benzimidazolone,
5-ethoxy-6-(2',3'-hydroxynaphthoylamino)-benzimidazolone,
5-(2',3'-hydroxynaphthoylamino)-benzoxazolone,
7-(2',3'-hydroxynaphthoylamino)-phenmorpholone-(3),
6-methyl-7-(2',3'-hydroxynaphthoylamino)-phenmorpholone-(3),
4-(2',3'-hydroxynaphthoylamino)-naphthostyryl,
4,6-dimethyl-7-(2',3'-hydroxynaphthoylamino)-quinolone-(2),
6-(2',3'-hydroxynaphthoylamino)-1,2,3,4-tetrahydro-quinazoline-dione-(2,4),
6-(2',3'-hydroxynaphthoylamino)-1,2,3,4-tetrahydro-quinoxaline-dione-(2,3),
5-acetoacetylamino-benzimidazolone,
4-methoxy-5-acetoacetylamino-benzimidazolone,
4-ethoxy-5-acetoacetylamino-benzimidazolone, 4-methyl-5-acetoacetylamino-benzimidazolone,
4-chloro-5-acetoacetylamino-benzimidazolone,
1-methyl-5-acetoacetylamino-benzimidazolone,
1-ethyl-5-acetoacetylamino-benzimidazolone,
1-n-propyl-5-acetoacetylamino-benzimidazolone,
1-iso-propyl-5-acetoacetylamino-benzimidazolone,
1-n-butyl-5-acetoacetylamino-benzimidazolone,
1-cyclohexyl-5-acetoacetylamino-benzimidazolone,
1-phenyl-5-acetoacetylamino-benzimidazolone,
1-(3'-chlorophenyl)-5-acetoacetylamino-benzimidazolone,
1-(4'-methylphenyl)-5-acetoacetylamino-benzimidazolone,
1-methyl-5-acetoacetylamino-6-chlorobenzimidazolone,
5-acetoacetylamino-benzoxazolone,
5-methyl-6-acetoacetylamino-benzoxazolone,
5-chloro-6-acetoacetylamino-benzoxazolone,
5-acetoacetylamino-indazolone,
6-acetoacetylamino-phenmorpholone-(3),
7-acetoacetylamino-phenmorpholone-(3),
6-acetoacetylamino-8-chloro-phenmorpholone-(3),
6-chloro-7-acetoacetylamino-phenmorpholone-(3),
6-methyl-7-acetoacetylamino-phenmorpholone-(3),
6-methoxy-7-acetoacetylamino-phenmorpholone-(3),
4-acetoacetylamino-naphthostyryl,
3-acetoacetylamino-naphthalimide,
4-methyl-7-acetoacetylamino-quinolone-(2),
4,6-dimethyl-7-acetoacetylamino-quinolone-(2),
4-methyl-6-acetoacetylamino-7-chloroquinolone-(2),
6-acetoacetylamino-3,4-dihydro-quinazolone-(4),
7-acetoacetylamino-3,4-dihydro-quinazolone-(4),
5-acetoacetylamino-6-chloro-3,4-dihydro-quinazolone-(4),
6-(4'-acetoacetylamino-benzoylamino)-3,4-dihydro-quinazolone-(4),
6-(3'-acetoacetylamino-4'-methoxy-benzoylamino)-3,4-dihydro-quinazolone-(4),
7-(3'-acetoacetylamino-4'-chlorobenzoylamino)-3,4-dihydro-quinazolone-(4),
2-(4'-acetoacetylamino-phenyl)-3,4-dihydro-quinazolone-(4),
2-(3'-acetoacetylamino-phenyl)-3,4-dihydro-quinazolone-(4),
2-(3'-acetoacetylamino-4'-methyl-phenyl)-3,4-dihydro-quinazolone-(4),
2-(3'-acetoacetylamino-4'-methoxy-phenyl)-3,4-dihydro-quinazolone-(4),
2-(3'-acetoacetylamino-4'-chlorophenyl)-3,4-dihydro-quinazolone-(4),
2-(3'-acetoacetylamino-4'-chlorophenyl)-6-chloro-3,4-dihydro-quinazolone-(4),
6-acetoacetylamino-1,2,3,4-tetrahydro-quinazoline-dione-(2,4),
7-acetoacetylamino-1,2,3,4-tetrahydro-quinazoline-dione-(2,4),
6-acetoacetylamino-1,2,3,4-tetrahydro-quinoxaline-dione-(2,3),
5-acetoacetylamino-1,2,3,4-tetrahydro-phthalazine-dione-(1,4).

The aforementioned coupling components are known compounds.

The coupling is advantageously effected by the gradual addition of the aqueous-alkaline solution of the coupling component to the acid solution of the diazonium salt, and is preferably performed with a pH-value of 4–6.

The pH-value is advantageously adjusted by addition of a buffer. Suitable buffers are, e.g. the salts, especially alkali salts, of formic acid, phosphoric acid or, in particular, of acetic acid. The alkaline solution of the coupling component advantageously contains a wetting, dispersing or emulsifying agent, for example, an aralkylsulphonate such as dodecylbenzenesulphonate, or the sodium salt of 1,1'-naphthylmethanesulphonic acid, polycondensation products of alkylene oxides such as the resultant product of the reaction of ethylene oxide with p-tert.-octylphenol, also alkyl esters of sulphoricinoleates, e.g. n-butylsulphoricinoleate. The dispersion of the coupling component can advantageously also contain protective colloids, e.g. methylcellulose, or small amounts of inert organic solvents difficultly soluble or insoluble in water, e.g. optionally halogenated or nitrated aromatic hydrocarbons, such as benzene, toluene, xylene, chlorobenzene, dichlorobenzenes or nitrobenzene, as well as aliphatic halogenated hydrocarbons such as, e.g. carbon tetrachloride or trichloroethylene; and also watermiscible organic solvents such as acetone, methyl ethyl ketone, methanol, ethanol or isopropanol, particularly dimethylformamide.

The coupling can be advantageously performed also by a process in which an acid solution of the diazonium salt is continuously combined, in a mixing nozzle, with an alkaline solution of the coupling component, whereby an immediate coupling of the components occurs. The resulting dyestuff dispersion is continuously taken from the mixing nozzle, and the dyestuff separated by filtration.

The new dyestuffs constitute valuable pigments which, in a finely divided form, can be used for the pigmenting of high-molecular organic material, e.g. cellulose ethers and cellulose esters, superpolyamides or superpolyurethanes or polyesters, acetyl cellulose, nitrocellulose, natural resins or synthetic resins, such as polymerisation resins or condensation resins, e.g. aminoplasts, especially urea- and melamine-formaldehyde resins, alkyd resins, phenoplasts, polycarbonates, polyolefins such as polystyrene, polyvinyl chloride, polyethylene, polypropylene, polyacrylonitrile, polyacrylic acid ester, rubber, casein, silicone and silicone resins, singly or in admixtures.

It is immaterial in this connection whether the mentioned high-molecular compounds are treated as plastic masses or melts, or in the form of spinning solutions, lacquers or printing pastes. Depending on the purpose of application, it proves advantageous to use the new pigments as toners, or in the form of preparations.

Where not otherwise stated, the term 'parts' in the following examples denotes parts by weight; percentages are given as per cent by weight, and temperatures are expressed in degrees Centigrade.

EXAMPLE 1

A monoazo pigment having excellent fastness to migration and light and corresponding to the formula

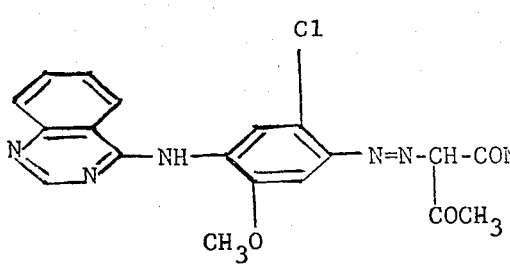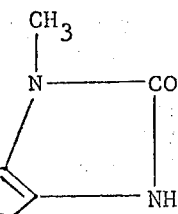

is obtained by a process in which 3 parts of 4-(2'-methoxy-4'-amino-5'-chloro-phenylamino)-quinazoline in 50 parts by volume of ice water is diazotised with 2.5 parts by volume of 10N hydrochloric acid and 2.5 parts by volume of 4N sodium nitrite solution. The diazo solution is added at 10°–20°C, in the course of 20 minutes, to a mixture of 2.47 parts of 1-methyl-5-acetoacetylamino-benzimidazolone and 3.3 parts of anhydrous sodium acetate in 100 parts by volume of dimethylformamide. After completion of coupling, the formed pigment is filtered off, washed with hot water and with methanol and dried.

In order to obtain a favourable colouristic form, the crude pigment is heated to boiling for 15 minutes in 50 parts by volume of N-methyl-pyrrolidone; after cooling, it is filtered off, washed with methanol and dried. There is thus obtained an amount of 4.85 parts of a dark-orange pigment powder, which produces in polyvinyl chloride an orange shade having excellent fastness to migration and to light.

The starting materials can be prepared as described in Example 1 of the German Patent Specification No. 1,138,318, or of the corresponding U.S. Pat. No. 1,211,555.

EXAMPLES 2–4

Similarly good results are obtained by employing, instead of the diazo component of Example 1, 4-(4'-amino-2',5'-dimethoxy-phenylamino)-quinazoline, 4-(4'amino-2'-methoxy-5'-methyl-phenylamino)-quinazoline or 4-(4'-amino-phenylamino)-quinazoline, with otherwise the same procedure as that described in Example 1. In the first and second case, orange-coloured pigments are obtained, and in the third case, a yellow pigment.

EXAMPLES 5–38

In the following table are listed further pigments which were obtained in the described manner. Column I contains the diazo component, column II the coupling component, and column III the shade of the polyvinyl chloride dyed with the pigment.

| | I | II | III |
|---|---|---|---|
| 5 | 4-(4'-Amino-2',5'-dimethoxy-phenylamino)-quinazoline | 5-(2'-Hydroxy-3'-naphthoyl-amino)-benzimidazolone | violet |
| 6 | 4-(4'-Amino-2'-methoxy-5'-chlorophenylamino)-quinazoline | " | red-violet |
| 7 | " | 5-Acetoacetylamino-benzimidazolone | orange |
| 8 | 4-(4'Amino-2'-methoxy-5'-methylphenylamino)-quinazoline | 5-(2'-Hydroxy-3'-naphthoyl-amino)-benzimidazolone | red-violet |
| 9 | " | 5-(2'-Hydroxy-3'-naphthoyl-amino)-6-methyl-benzimidazolone | blue |
| 10 | " | 1-Methyl-5-(2'-hydroxy-3'-naphthoylamino)-benzimidazolone | grey-blue |
| 11 | " | 5-(2'-Hydroxy-3'-naphthoyl-amino)-6-chloro-benzimidazolone | red-violet |
| 12 | 4-(4'-Amino-2',5'-diethoxy-phenylamino)-quinazoline | 5-(2'-Hydroxy-3'-naphthoyl-amino)-benzimidazolone | violet |
| 13 | 4-(4'-Amino-2'-methoxy-5'-methylphenylamino)-quinazoline | 4-Methyl-6-phenoxy-7-acetoacetyl-amino-quinolone-(2) | orange |
| 14 | 4-(4'-Amino-2'-methoxy-5'-methylphenylamino)-quinazoline | 4-Methyl-6-acetoacetyl-amino-7-chloro-quinolone-(2) | brown-orange |
| 15 | " | 4,6-Dimethyl-7-acetoacetyl-amino-quinolone-(2) | yellow |
| 16 | " | 6-Acetoacetylamino-quinazolone-(4) | red-yellow |
| 17 | " | 6-Acetoacetylamino-quinazoline-dione-(2,4) | red-orange |
| 18 | " | 5-Acetoacetylamino-6-chloro-benzimidazolone | orange |
| 19 | " | 6-(2'-Hydroxy-3'-naphthoyl-amino)-quinazoline-dione-(2,4) | blue-violet |
| 20 | " | 4-Methyl-7-(2'-hydroxy-3'-naphthoylamino)-quinolone-(2) | blue-violet |
| 21 | 4-(4'-Amino-2',5'-diethoxy-phenylamino)-quinazoline | 1-Methyl-5-acetoacetylamino-benzimidazolone | red-orange |
| 22 | 4-(4'-Amino-2',5'-dimethoxy-phenylamino)-quinazoline | -Methyl-7-acetoacetylamino-phenmorpholone-(3) | yellow |
| 23 | 4-(4'-Amino-2'-methoxy-5'-chloro-phenylamino)-quinazoline | 7-(2'-Hydroxy-3'-naphthoyl-amino)-phenmorpholone-(3) | brown-violet |
| 24 | 4-(4'-Amino-2'-methoxy-5'-methyl-phenylamino)-quinazoline | " | red-violet |

| I | II | III |
|---|---|---|
| 25 | " | 5-Acetoacetylamino-benzimidazolone | orange |
| 26 | 4-(4'-Amino-2'-methyl-phenylamino)-quinazoline | " | yellow |
| 27 | 4-(3'-Amino-6'-methyl-phenylamino)-quinazoline | 6-Methyl-7-(2'-hydroxy-3'-naphthoylamino)-phenmorpholone-(3) | red |
| 28 | 4-(3'-Amino-6'-methyl-phenylamino)-quinazoline | 5-(2'-Hydroxy-3'-naphthoylamino)-benzimidazolone | claret shade |
| 29 | " | 6-Methyl-7-acetoacetyl-amino-phenmorpholone-(3) | green-yellow |
| 30 | " | 5-Acetoacetylamino-benzimidazolone | green-yellow |
| 31 | 4-(4'-Amino-2',5'-diethoxy-phenylamino)-quinazoline | 7-(2'-Hydroxy-3'-naphthoylamino)-phenmorpholon-(3) | blue |
| 32 | " | 6-Methyl-7-(2'-hydroxy-3'-naphthoylamino)-phenmorpholone-(3) | blue |
| 33 | " | 5-Acetoacetylamino-benzimidazolone | red-orange |
| 34 | 4-(3'-Amino-phenylamino)-quinazoline | 6-Methyl-7-acetoacetyl-amino-phenmorpholone-(3) | green-yellow |
| 35 | 4-(4'-Amino-phenylamino)-quinazoline | 5-(2'-Hydroxy-3'-naphthoylamino)-benzimidazolone | maroon shade |
| 36 | " | 6-Methyl-7-acetoacetylamino-phenmorpholone-(3) | yellow |
| 37 | 4-(3'-Amino-phenylamino)-quinazoline | 6-Methyl-7-(2'-hydroxy-3'-naphthoylamino)-phenmorpholone-(3) | red |
| 38 | 4-(4'-Amino-2'-methoxy-phenylamino)-quinazoline | 5-(2'-Hydroxy-3'-naphthoylamino)-benzimidazolone | violet |

We claim:

1. A monoazo pigment of the formula

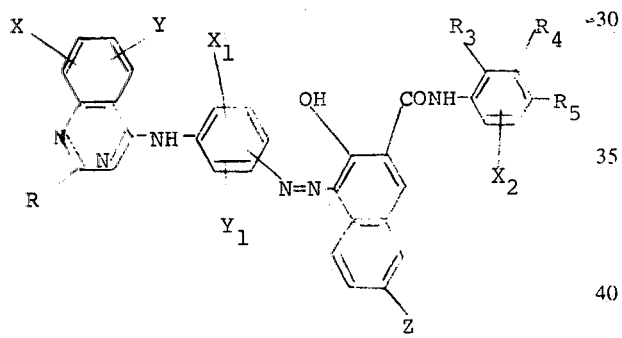

wherein R is hydrogen, lower alkyl or phenyl, X and Y are hydrogen, chloro, lower alkyl, lower alkoxy, $X_1$ and $Y_1$ are hydrogen, chloro, lower alkyl, lower alkoxy, lower alkoxy carbonyl, trifluoromethyl or cyano, $R_3$ and $R_4$ or $R_4$ and $R_5$ together form a heterocyclic ring of the formula

(VI)

wherein $R_6$ and $R_7$ is hydrogen or lower alkyl, $X_2$ is hydrogen, chloro, lower alkyl, lower alkoxy or nitro, and Z is hydrogen, chloro, methoxy or cyano.

2. A monoazo pigment of the formula

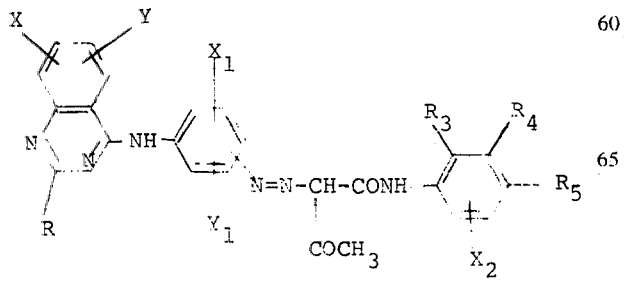

wherein R is hydrogen, lower alkyl or phenyl, X and Y are hydrogen, chloro, lower alkyl or lower alkoxy, $X_1$ and $Y_1$ are hydrogen, chloro, lower alkyl, lower alkoxy, lower alkoxycarbonyl, trifluoromethyl or cyano, $R_3$ and $R_4$ or $R_4$ and $R_5$ together form a heterocyclic ring of the formula

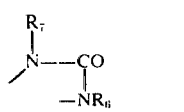

(VI)

wherein $R_6$ and $R_7$ is hydrogen or lower alkyl, $X_2$ is hydrogen, chloro, lower alkyl, lower alkoxy or nitro and Z is hydrogen, chloro, methoxy or cyano.

3. Monoazo pigment according to claim 2 of the formula

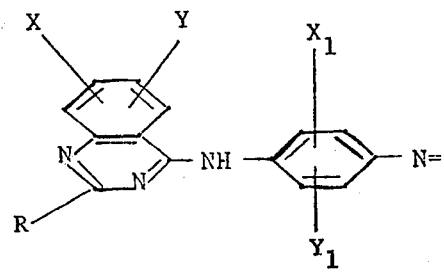

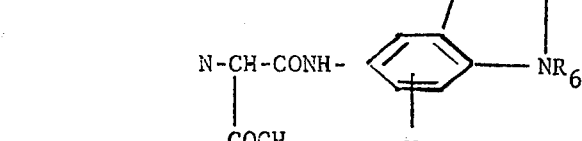

wherein $R_6$ and $R_7$ is hydrogen or lower alkyl.

4. Monoazo pigment according to claim 2 of the formula

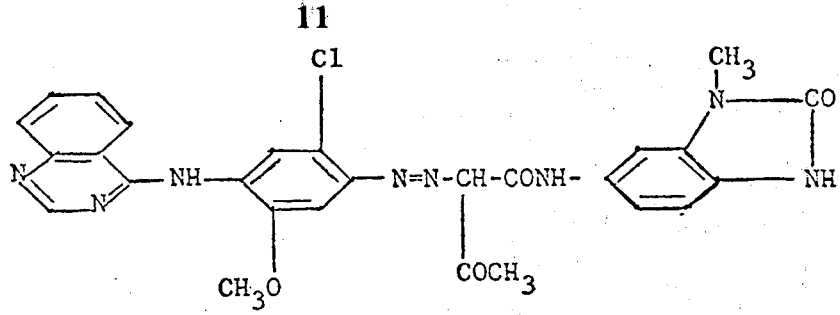
5. Monoazo pigment according to claim 2 of the formula
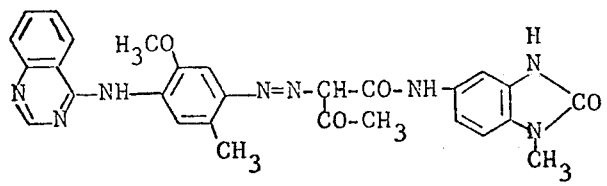
6. Monoazo pigment according to claim 2 of the formula
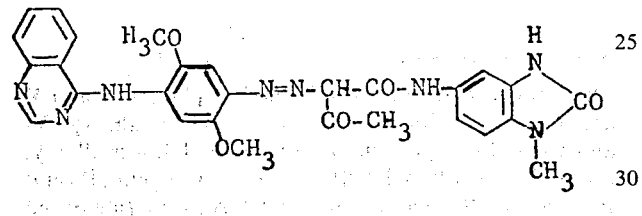
7. Monoazo pigment according to claim 1 of the formula
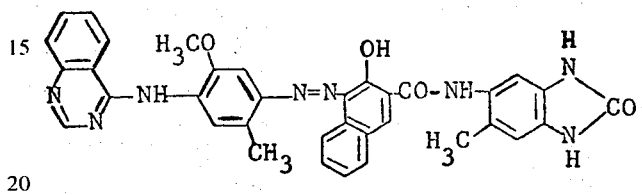
8. Monoazo pigment according to claim 1 of the formula
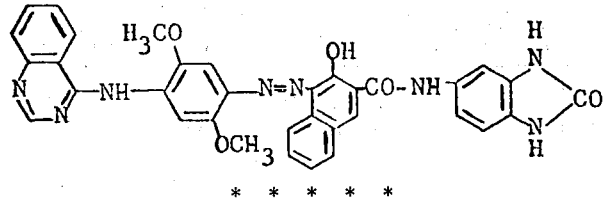
* * * * *